United States Patent [19]
Fukumi et al.

[11] 3,932,497
[45] Jan. 13, 1976

[54] PROCESS FOR PREPARING 4-AMINOMETHYL CYCLOHEXANE CARBOXYLIC ACID-1

[75] Inventors: Hirokazu Fukumi, Ooi; Koryo Itoh; Yutaka Usubuchi, both of Tokyo; Hirataka Itoh, Fujimi, all of Japan

[73] Assignee: Asahi Kasei Kogyo Kabushiki Kaisha, Osaka, Japan

[22] Filed: Sept. 19, 1973

[21] Appl. No.: 398,598

[30] Foreign Application Priority Data
Oct. 2, 1972   Japan .............................. 47-98020

[52] U.S. Cl. ............................................ 260/514 J
[51] Int. Cl.² ......................................... C07C 51/36
[58] Field of Search ................... 260/514 J, 514 R

[56]           References Cited
       FOREIGN PATENTS OR APPLICATIONS
  675,582   5/1966   Belgium ............................. 260/514
1,929,743   6/1969   Germany ........................... 260/514
  433,102   2/1968   Japan ................................. 260/514

Primary Examiner—Robert Gerstl

[57]   ABSTRACT

An economically attractive process for industrial production of 4-aminomethyl cyclohexane carboxylic acid-1 in high purity and in high yield is provided. p-Amino benzoic acid is hydrogenated utilizing a ruthenium catalyst in the presence of a specific amount of alkali metal hydroxide. The resulting product is useful as the starting material for polymers or pharmaceuticals.

5 Claims, No Drawings

PROCESS FOR PREPARING 4-AMINOMETHYL CYCLOHEXANE CARBOXYLIC ACID-1

BACKGROUND

One commercially known process for the synthesis of 4-aminomethyl cyclohexane carboxylic acid-1 is via hydrogenation of the benzene nucleus of p-aminomethyl benzoic acid or the derivatives thereof. This process, however, is expensive, so that an improved process would be commercially useful.

One method which has been suggested is hydrogenating of cyanobenzoic acid in the presence of a catalyst comprising a platinum compound or a platinum compound together with a rhodium compound. This method, however, is not commercially useful because of the expense of the catalyst, its lack of selectivity, and the unacceptable number of side reactions.

Another method involves hydrogenating the aromatic nucleus of aminomethyl benzoic acid-N-acetate in the presence of nickel catalyst at an elevated temperature under high pressure to produce N-acetyl-4-aminomethyl cyclohexane carboxylic acid-1, which was further hydrolyzed to produce 4-aminomethyl cyclohexane carboxylic acid-1. In an improvement of this process, p-aminomethyl benzoic acid is hydrogenated in the presence of a ruthenium catalyst.

The method is not commercially feasible, however, because of the expense of the catalyst, the large amounts which are required, and because it is poisoned in the course of the reaction and must be regenerated.

In order to establish a commercially feasible and economically advantageous method for the production of 4-aminomethyl cyclohexane carboxylic acid-1 directly from p-aminomethyl benzoic acid, it is a prerequisite to prevent decrease of activity of the catalyst and to reduce the amount of the catalyst needed, thereby making the process economical by enabling repeated use of the catalyst.

SUMMARY OF THE INVENTION

The present invention relates to an economically advantageous and commercially feasible process for preparing 4-aminomethyl cyclohexane carboxylic acid-1 by hydrogenating p-aminomethyl benzoic acid in the presence of ruthenium as a catalyst.

DETAILED DESCRIPTION OF THE INVENTION

In accordance with this invention, the amount of hydrogen employed per mol of p-aminomethyl benzoic acid is at least 3 mols. Hydrogen pressure is 50–200 kg/cm$^2$, preferably 80–150 kg/cm$^2$.

p-Aminomethyl benzoic acid, starting material of the invention, can be advantageously prepared by hydrogenating p-cyanobenzoic acid methyl ester in an alkali media, as described for example in Japanese Patent Application No. 95243/1971. p-Cyanobenzoic acid methyl ester can be selectively obtained by distillation of the melted reaction product of terephthlonitrile, dimethyl terepthalate and terepthalic acid.

In the present invention, the role of the catalyst is very important.

Ruthenium catalysts which may be employed in the invention include ruthenium oxide, ruthenium hydroxide and metallic ruthenium supported on an inert carrier. Carriers employed include for example carbon, calcium carbonate, rare earth oxides such as cerium, praseodymium, or lanthanum, rare earth carbonates such as cerium, praseodymium or lanthanum, mixed rare earth oxide-carbonates, alumina, barium sulfate, kieselguhr, pumice, diaspore, bauxite, periclase, zirconia, titania, diatomaceous earth, calcium sulfate, calcium oxide, barium oxide, barium carbonate, strontium carbonate, strontium oxide, strontium sulfate, silica, silica-alumina, etched nickel, Nichrome and Inconel wire.

Among these compounds, alumina, kieselguhr, carbon, barium sulfate or calcium carbonate are preferred. The most preferred catalyst is ruthenium supported on a carrier. The ruthenium content in the catalyst is 1–10 weight %, preferably 4–6 weight %. By adding 1–35 gram equivalents, preferably 1–10 gram equivalents per mol of the p-aminomethyl benzoic acid, of at least one alkali metal hydroxide selected from the group consisting of sodium hydroxide, potassium hydroxide and calcium hydroxide, the amount per reaction of ruthenium metal in the catalyst used can be reduced to 0.025–0.25% by weight based on p-aminomethyl benzoic acid. The yield obtained is comparable to that obtained when the quantity of catalyst in the form of 5% by weight ruthenium metal on active carbon is as high as 30% based on p-aminomethyl benzoic acid, the amount of ruthenium based on p-aminomethyl benzoic acid being 1.5% by weight. As a result, the reaction is economically feasible. To improve the economics, the amount of ruthenium catalyst should be as low as possible while still obtaining complete conversion of starting material.

According to the aforesaid known method, hydrogenation of p-aminomethyl benzoic acid in aqueous ammonia using 30% by weight of catalyst based on p-aminomethyl benzoic acid gives 4-aminomethyl cyclohexane carboxylic acid-1 in a yield as high as above 90%. However, the catalyst cannot usually be utilized more than three times without regeneration. As shown in Table 1, when the amount of catalyst is 8%, or below, there is a substantial decrease in percent conversion and yields.

Table 1

| the amount of catalyst per reaction %/material B | from material B to A conversion % | selectivity % | yield % | starting material still in reaction liquid (material B) % | initial pressure of H2 (kg/cm) | temperature °C | time Hr |
|---|---|---|---|---|---|---|---|
| 30 (1.5)* | 100 | 97 | 97 | 0 | 100 | 150 | 3 |
| 20 (1.0) | 100 | 97 | 97 | 0 | 100 | 150 | 3 |
| 8 (0.4) | 80 | 98 | 78 | 19 | 100 | 150 | 6 |

Table 1-continued

| the amount of catalyst per reaction %/material B | from material B to A | | | starting material still in reaction liquid (material B) % | reaction conditions | | time Hr |
| --- | --- | --- | --- | --- | --- | --- | --- |
| | conversion % | selectivity % | yield % | | initial pressure of H2 (kg/cm) | temperature °C | |
| 5 (0.25) | 58 | 96 | 56 | 42 | 100 | 150 | 16 |

*Figures in parentheses are the weight % of ruthenium metal catalyst based on the amount of p-aminomethyl benzoic acid.

Note:
Material A in this and succeeding tables means 4-aminomethyl cyclohexane carboxylic acid-1.
Material B means p-aminomethyl benzoic acid.
Catalyst: 5% ruthenium on carbon.
Starting Material: Material B 10g
Solvent: 5% aqueous ammonia 70ml
Vessel: 300 ml-autoclave made of stainless steel (sus 32)

The phenomena discussed above and illustrated in the table make clear the reasons why the procedure is not commercially attractive.

It has now been found that the amount of catalyst required may be reduced, and its high activity prolonged by the addition of 1–35 mol equivalents (preferably 1–10) of at least one alkali metal hydroxide selected from the group consisting of sodium hydroxide, potassium hydroxide and calcium hydroxide per mol of p-aminomethyl benzoic acid. The effect of the addition is shown in Table 2. The addition of increased quantities of the selected alkali does not adversely affect the reaction, except that it increases the cost of purification, especially if an ion exchange procedure is used.

equivalent. A residue of p-aminomethyl benzoic acid is not desirable, because in the purification step, both p-aminomethyl benzoic acid and 4-aminomethyl cyclohexane carboxylic acid-1 shown similar characteristics so that it is extremely difficult to obtain highly pure 4-aminomethyl cyclohexane carboxylic acid-1. If the amount of residual p-aminomethyl benzoic acid is more than 12% in the reaction product it cannot be removed even after five recrystallizations from boiling water.

Testing results with the change of the amount of additive are summarized in Table 3.

Table 3

| Compound to be added (gram equivalent based on 1 mol of the starting material) | from material B to A | | | starting material still in reaction liquid (material B) % | reaction conditions | | time Hr |
| --- | --- | --- | --- | --- | --- | --- | --- |
| | conversion % | selectivity % | yield % | | $H_2$ initial pressure kg/cm | temperature °C | |
| 0.5 times | 70 | 98 | 68.7 | 31 | 100 | 180 | 12 |
| 0.9 | 92 | 98 | 90 | 8 | 100 | 170 | 8 |
| 1.0 | 100 | 96 | 96 | 0 | 100 | 155 | 2 |
| 2.0 | 100 | 98 | 98 | 0 | 100 | 155 | 1½ |
| 5.0 | 100 | 97 | 97 | 0 | 100 | 155 | 1½ |
| 10.0 | 100 | 98 | 98 | 0 | 100 | 155 | 1½ |

Note: Compound to be added: NaOH
Catalyst: Catalyst comprising 5% ruthenium on carbon
Amount of catalyst: 3% by weight ratio to starting material B. (The amount of ruthenium metal being 0.15% by weight based on p-aminomethyl benzoic acid.)
Solvent: Water 70 ml
Vessel: 300 ml-autoclave made of stainless steel (sus 32)
Starting material: material B 10 g.

Amongst the hydroxides which may be used for the present invention, sodium hydroxide, potassium hydroxide and calcium hydroxide are effective. Of these, Table 2

| Compound added | from material B to A | | | starting material still in reaction liquid (material B) % | reaction conditions | | time |
| --- | --- | --- | --- | --- | --- | --- | --- |
| | conversion % | selectivity % | yield % | | $H_2$ initial pressure kg/cm | temperature °C | Hr |
| None | 8 | 90 | 7 | 90 | 100 | 190 | 16 |
| $NH_4OH$ | 25 | 94 | 23.5 | 75 | 100 | 180 | 8 |
| NaOH | 100 | 97 | 97 | 0 | 100 | 150 | 1½ |
| KOH | 100 | 96 | 96 | 0 | 100 | 150 | 1½ |

Note: The amount based on 1 mol of the starting material of $NH_4OH$, NaOH and KOH is 1.5 gram equivalent.
Type and the amount of catalyst: Catalyst comprising 5% ruthenium on carbon
The amount by weight ratio is 3% based on starting material B.
(The amount of ruthenium metal being 0.15% by weight based on p-aminomethyl benzoic acid.)
Starting material: material B 10 g
Solvent: 5% aqueous ammonia (70 ml) or water (70 ml)
Vessel: 300 ml-autoclave made of stainless steel (sus 32)

As shown in Table 3, residuum of p-aminomethyl benzoic acid in the reaction liquid becomes noticeable only when the amount of alkali added is less than 1 sodium hydroxide and potassium hydroxide are especially preferred. The effect of the addition of various alkali metal hydroxides is shown in Table 4.

Table 4

| alkali metal hydroxide | from material B to A conversion % | selectivity % | yield % | starting material still in reaction liquid (material B) % | reaction conditions H₂ initial pressure kg/cm | temperature °C | time Hr |
| --- | --- | --- | --- | --- | --- | --- | --- |
| NaOH | 100 | 98 | 98 | 0 | 100 | 155 | 1½ |
| KOH | 100 | 97 | 97 | 0 | 100 | 155 | 1½ |
| Ca(OH)₂ | 100 | 93 | 93 | 0 | 100 | 155 | 1½ |

(Note) The amount by weight ratio of alkali metal hydroxide is 2 times gram equivalent based on mol of the catalyst used.
Catalyst: catalyst comprising 5% ruthenium on carbon
The amount of catalyst: 3% by weight ratio based on starting material B.
(The amount of ruthenium metal being 0.15% by weight based on p-aminomethyl benzoic acid.)
Starting material: 10 g
Solvent: Water 70 ml
Vessel: 300 ml-autoclave made of stainless steel (sus 32)

According to the present invention, reaction temperature is 90–200°C, preferably 140–170°C, and reaction pressure is 50–200 kg/cm², preferably 80–150 kg/cm².

In practicing the present invention, any of a variety of conventionaly techniques known for those skilled in the art can be employed. The order of addition of a starting material, catalyst, alkali metal hydroxide and solvent is irrelevant in the present invention. It is preferable to stir the reactants at the beginning of the reaction, but continuance of stirring until completion of the reaction is not necessarily required.

After reaction, the reaction liquid is taken out and 4-aminomethyl cyclohexane carboxylic acid-1 is either directly adsorbed to the H⁺-type ion exchange resin and dissolved into aqueous ammonia, or the reaction liquid is first neutralized, concentrated and then by recrystallization, highly pure 4-aminomethyl cyclohexane carboxylic acid-1 is isolated in a high yield.

4-Aminomethyl cyclohexane carboxylic acid-1 thus obtained is useful as the starting material for polymers or pharmaceuticals.

The present invention will be further illustrated by, but not limited to, the following examples.

EXAMPLE 1

Into a 300-ml autoclave made of stainless steel (sus 32) equipped with a stirrer, 10 g of p-aminomethyl benzoic acid, 3.0 g of sodium hydroxide, 70 ml of water and 0.3 g of active carbon carrying 5% by weight of ruthenium was charged and then hydrogen gas was charged at a normal temperature until the pressure increased to 100 kg/cm². Reaction was effected at 155°C for 1.5 hour. The catalyst was separated by filtration and the filtrate was passed through a column filled with 400 ml of the H⁺-type ion exchange resin Amberlite 200 (Rhom and Haas Co.). The resin was washed with 1 liter of water. Then 800 ml of 1-N aqueous ammonia was passed through the column, the eluent was concentrated and then the concentrate was dried to obtain 10.3 g of white solid, which was identified as 4-aminomethyl cyclohexane carboxylic acid-1 by NMR and infrared analysis. Purity of 4-aminomethyl cyclohexane carboxylic acid-1 thus obtained was 98.5% by titration of the amino group and by gas chromatography.

EXAMPLES 2–9

The results of changing the amount of catalyst and types and the amount of alkali metal hydroxide are summarized in Table 5.

Table 5

| Ex. | catalyst (%) (based on material B) | Alkali metal hydroxide type of compound | gram equivalent mol of material B | reaction condition H₂ initial pressure kg/cm | temperature °C | time Hr | from material B to A conversion % | selectivity % | yield % | the amount of residuum (material B) % |
| --- | --- | --- | --- | --- | --- | --- | --- | --- | --- | --- |
| 2 | 1.0 (0.05)* | NaOH | 1.0 | 100 | 155 | 6 | 99 | 97 | 96 | 0.5 |
| 3 | 1.0 (0.05) | " | 10 | " | " | 4 | 100 | 98 | 98 | 0 |
| 4 | 1.5 (0.075) | " | 10 | " | " | 3 | " | 95 | 95 | 0 |
| 5 | 3.0 (0.15) | " | 10 | " | " | 1½ | " | 98 | 98 | 0 |
| 6 | 5.0 (0.25) | " | 1.0 | " | " | " | " | 98 | 98 | 0 |
| 7 | 2.0 (0.1) | KOH | 2.0 | " | " | " | " | 97 | 97 | 0 |
| 8 | 3.0 (0.15) | Ca(OH)₂ | 2.0 | " | " | " | " | 97 | 97 | 0 |
| 9 | 5.0 (0.25) | " | 1.5 | " | 160 | " | " | 96 | 96 | 0 |

*Figures in parentheses are weight % of ruthenium metal based on material B.
Type and the amount of catalyst: catalyst comprising 5% ruthenium on carbon.
The amount by weight ratio is 3% based on starting material B. (The amount of ruthenium metal being 0.15% by weight based on p-aminomethyl benzoic acid.)

What is claimed is:

1. A process for the catalytic hydrogenation of p-aminomethyl benzoic acid to form 4-aminomethyl cyclohexane carboxylic acid-1 utilizing a ruthenium metal catalyst which is characterized by effecting the reaction in an aqueous medium at a hydrogen pressure of 50 to 200 kg/cm² in the presence of from 1 to 35 gram equivalent per mol of p-aminomethyl benzoic acid of at least one alkali metal hydroxide selected from the group consisting of sodium, potassium and calcium hydroxide, the amount of ruthenium metal in the catalyst employed being from 0.025 to 0.25% by weight based on the weight of p-aminomethyl benzoic acid.

2. A process according to claim 1 wherein the reaction temperature is from 90°C to 200°C.

3. A process according to claim 1 wherein the amount of hydrogen employed is 3.5 mols per mol of p-aminomethyl benzoic acid.

4. A process according to claim 1 wherein the amount of alkali metal hydroxide is 2 gram equivalent per mol of p-aminomethyl benzoic acid.

5. A process for the catalytic hydrogenation of p-aminomethyl benzoic acid to form 4-aminomethyl cyclohexane carboxylic acid-1 utilizing a ruthenium metal catalyst which is characterized by effecting the reaction in aqueous sodium hydroxide at a temperature of 155°C and a pressure of 100 kg/cm$^2$ wherein the amount of sodium hydroxide is 2 gram equivalents per mol of p-aminomethyl benzoic acid and the amount of ruthenium metal in the catalyst employed is from 0.025 to 0.25% by weight based on the weight of p-aminomethyl benzoic acid.

* * * * *